Patented Oct. 9, 1934

1,976,394

UNITED STATES PATENT OFFICE 1,976,394

RUBBER PRODUCT AND METHOD OF MAKING SAME

John Helfrich, Westfield, N. J.

No Drawing. Application July 30, 1931,
Serial No. 554,165

12 Claims. (Cl. 18—50)

This invention relates, generally, to rubber; and the invention relates, more particularly, to a new and improved rubber product, and a new and improved method of making the same.

One of the objects of my invention is to produce a rubber product from latex, which shall be sufficiently non-tacky, shall maintain its elasticity and flexibility, and can be treated with a great many binding and filling materials, without the common necessity of vulcanizing the rubber by means of sulphur.

Another object of my invention is to produce a rubber product which may be free from sulphur, and which can be prepared directly from latex or from any other suitable rubber dispersion and which will have the desirable properties of rubber vulcanized in the ordinary manner with sulphur.

Another object of my invention is to produce a stable rubber product or paste. This new product is a compound of rubber and a suitable aluminum chromium or iron salt.

Another object of my invention is to provide a method whereby a spreadable paste can be secured from latex or any other suitable rubber dispersion, which paste can be used for impregnating fabrics or for various other purposes, and which displays the desired properties of resistance to temperature changes, sufficient freedom from tackiness, flexibility and extensibility, without requiring a subsequent vulcanization operation.

Other objects of my invention will be set forth in the following description which illustrates a preferred embodiment thereof, it being understood that the above general statement of the objects of my invention is intended to generally explain the same and not to limit it in any manner.

It has heretofore been well known to coagulate latex by adding thereto various acids and salts. However, the coagulum thus produced could not be conveniently used for impregnating fabrics or for many other purposes and in any event a stable rubber product, which would be sufficiently non-tacky and resistant to temperature changes, could not be secured save by vulcanization by means of sulphur. The vulcanization step was expensive and objectionable for various reasons, especially in vulcanizing rubber tires or other articles made wholly or in part of rubber, where long treatment and high temperature were necessary.

I have discovered that when an ordinary latex preserved in the ordinary way, as with ammonia, for example, is treated with a basic salt of aluminum, chromium or iron, that a smooth spreadable paste is secured from the latex, and that this paste has many desirable properties which will be later set forth.

By way of example, the invention may be described by using basic chromium salts. Amongst the chromium salts which I have found satisfactory are basic chromium salts wherein chromium is in its trivalent form. For example, basic chromium sulphate (Cr. OH. SO$_4$) or basic chromium chloride (Cr$_2$.(OH)$_3$.Cl$_3$) may be used. Preferably a neutral salt or salts such as sodium sulphate, sodium chloride or sodium acetate is added along with the basic chromium salt to the rubber dispersion. These neutral salts evidently serve as buffers or agents for lowering the hydrogen ion concentration resulting from the hydrolysis of the basic chromium compound used. After the basic salt and the latex have been allowed to react for a sufficient period, I prefer to neutralize any acid which may be present in the reaction mass due to the hydrolysis of the basic salt, by adding a sufficient amount of an alkali such as sodium bicarbonate or borax.

While I do not wish to limit myself to the specific operations and proportions, or to the sequence of steps specified in the preferred example of my invention, practical working directions are as follows:

A 5% solution of basic chromic sulphate is prepared by dissolving 5 grams of the salt in 100 cc. of distilled water. The basic chromic sulphate is preferably the commercial salt which is anhydrous and which normally contains approximately 25 to 30 percent by weight of sodium sulphate, which neutral salt content evidently serves as a buffer as previously mentioned. 100 cc. of water are then added to the solution thus giving a total volume of 200 cc. To this 200 cc. of the basic chromium salt solution, I now add 100 cc. of ordinary latex which has been preserved with a small quantity of ammonia or other alkali in the ordinary commercial way, and which ordinarily contains about 36 parts of latex solids by volume. The latex is gradually added to the basic chromium salt solution with constant mixing. The reaction between the basic chromium compound or salt and the latex is exceedingly rapid and is complete within a few minutes. Preferably the mixture is allowed to stand for one-half hour before further treatment, although the mixture may be allowed to stand for a much longer time or even indefinitely without injury thereto, if desired.

After the treatment of the latex with the basic chromium salt, I prefer to neutralize any free acid which may have been formed in the reaction mass by hydrolysis, by adding a small amount of an alkali such as sodium bicarbonate or borax. For example, if 5 grams of the chromium salt have been utilized as above mentioned, I prefer to add ¼ of a gram of sodium bicarbonate dissolved in 10 cc. of distilled water, this being vigorously mixed with the reaction mass.

The reaction mass is then filtered by any suitable method such as by suction for example, and a smooth spreadable paste is separated from the liquid constituents of the reaction mass. This paste may be pressed between two pieces of cloth, such for example, as ordinary duck, to more thoroughly dry it and to shape it to any desired form, and the cake thus produced is then dried by exposing it to ordinary room temperature or by gently warming it as by allowing dry air to circulate over it or by heating in an oven or the like to a temperature of approximately 220° F.

The resultant product is strong, extensible and flexible, and it also is sufficiently non-tacky for ordinary use. It is much more extensible than ordinary vulcanized rubber. It does not lose these desirable properties upon being heated to a temperature as high as 220° F. Upon examination with the ultramicroscope, it can be seen that the chromium salt is very uniformly and intimately combined with the latex. A true compound has been formed with the latex, producing a desirable rubber product of uniform texture. Evidently the chromium basic salt ions in combining with the latex particles constitute a stabilizing or protective agency which permits the rubber to retain its well-known desirable properties, while enhancing some of said desirable properties. Likewise, an examination with the ultramicroscope shows that the rubber particles have not aggregated, but that they have substantially the same size as in the original latex or rubber dispersion.

Likewise, the final product cannot be rendered too tacky and it cannot be swelled by being immersed in water. The smooth paste can be used for impregnating any suitable fabric in the ordinary manner, and when the paste has dried and set, it renders the fabric perfectly waterproof. By removing all of the moisture from the product, the same can be reduced to powdered form as, for example, by spray drying, and molded to any desired shape, either by itself or in conjunction with other materials, such as zinc oxide or any other suitable fillers.

Upon analyzing a sample prepared as above mentioned, save that 450 cc. of the basic chromium sulphate solution (analyzing at about 2½% of chromic oxide ($Cr_2O_3$) were utilized, together with 450 cc. of distilled water and 450 cc. of latex, (including treatment with sodium bicarbonate) the following was determined:—

The chromium solution contained 11.34 grams of available chromic oxide ($Cr_2O_3$). The latex contained 155.2 grams of total solids. Upon ashing a sample of the dried and set material whose weight was .685 grams, I found that the weight of the ash was .047 grams. In preparing the paste above mentioned, the filtrate is colorless and upon testing this with sodium peroxide in the ordinary manner, the familiar yellow color is not produced, so that it seems clear that the filtrate is free from chromium or any salt thereof, showing that the chromium salt has combined with the rubber in the latex. This is confirmed by the abnormally high percentage of the ash, found as above mentioned. The ash secured by the above test had a distinctive green color which would indicate the presence of chromic oxide. Upon fusing the ash thus produced with a potassium carbonate-sodium carbonate fusing mixture, I determined that the percentage of chromium oxide in the ash was 98.76%.

I have also found that before the paste secured as above mentioned has dried and set, that it may be mixed with various fillers such as clay, zinc oxide, carbon black and other well known filling and coloring materials commonly used for filling and coloring rubber. By adding sufficient filling material to the rubber such as, for example, by preparing a mixture containing 80% of the paste, 10% of clay, and 10% of zinc oxide which are thoroughly intermixed before the mixture is allowed to dry and set, a stiff, strong and resilient block of material can be made which resists great bending pressure. Hence, it is to be understood that when I claim the novel composition, it is intended to include a composition of pure rubber, or of rubber intermixed with a filler.

While I do not wish to limit myself to any definite theory of operation, I believe that the following occurs.

When an ordinary coagulant salt is added to latex, such as calcium chloride for example, the coagulant merely reacts with the proteins or other non-rubber colloids in latex. If there is any reaction, either physical or chemical, between the rubber and the salt, this does not produce any appreciable effect because the coagulation is too rapid. By utilizing a basic chromium salt, a very slight acidity is imparted to the latex by the hydrolysis of the basic salt. This acidity is so slight that it cannot be detected by ordinary methods. It would require a hydrogen ion determination to detect the acidity of the latex mixture. This very slight acidity causes the rubber to coagulate very slowly so that the chromium or the chromium compound can combine with the rubber to form a true compound and to alter the properties of the rubber so that it exhibits all the desirable properties of ordinary vulcanized rubber, as well as additional desirable properties, without the necessity of vulcanization. My invention is broadly new in that it produces a product comparable to ordinary vulcanized rubber without the use of sulphur and without any heating process, save the heat which may be employed for drying the paste more or less rapidly.

Likewise, while centrifugal separation is not necessary, it may be employed with advantage if it is desired to more quickly separate the paste from the latex.

As the result of careful experimentation, it has been found that the basic salts of two other trivalent metals, viz. aluminum and iron may be used in lieu of the basic chromium salts to form the novel rubber product of the present invention. For example, basic aluminum sulphate, or basic ferric sulphate may be substituted for the basic chromium sulphate given in the preceding example, and the resultant rubber product produced will have substantially the same desirable properties and qualities as the product produced by the use of the basic chromium salts. Therefore, it is not intended to limit this invention to the use of chromium salts alone, but it is intended to also include the use of basic salts or aluminum and of trivalent iron.

While I have shown a preferred method of securing the improved product specified herein, the said product is broadly new and I do not wish that the claims therefore should be restricted to the specific method of manufacture disclosed herein.

Likewise, while I prefer to have the chromium, aluminum, or iron compound react with a rubber dispersion either natural or artificial, I do not wish my invention to be restricted to the treatment of a rubber dispersion.

I have shown a preferred embodiment of my invention, but it is clear that numerous changes and omissions could be made without departing from its spirit.

What is claimed is:

1. The method of preparing a spreadable and stable paste from a rubber dispersion or latex, which consists in intermixing a basic salt of one of the three trivalent metals described with the rubber dispersion.

2. The method of preparing a spreadable and stable paste from a rubber dispersion, which consists in intermixing a basic salt of chromium with the rubber dispersion.

3. The method of preparing a stable rubber product from a rubber dispersion, which consists in thoroughly intermixing a mixture of a basic salt of chromium and a neutral salt, with the rubber dispersion.

4. The method of treating a rubber dispersion to produce a stable rubber product, which consists in causing rubber particles in the aqueous portion of the dispersion to unite with the ions of a basic salt of chromium in solution in the dispersion.

5. The method of preparing a stable rubber product from a rubber dispersion, which consists in thoroughly intermixing an aqueous solution of a basic chromium salt with the rubber dispersion and thereafter neutralizing any free acid which may have been formed during the reaction by adding a small quantity of an alkali.

6. A method of preparing a stable rubber product from a rubber dispersion, which consists in thoroughly intermixing an aqueous solution of a basic chromium salt and a neutral salt with the rubber dispersion, and thereafter neutralizing any free acid which may have been formed during the reaction by adding a small quantity of an alkali.

7. As a new product of manufacture, a solid mass which is substantially stable when subjected to ordinary temperature changes, said mass containing rubber combined with a protective agent adapted to stabilize the same, said protective agent consisting of a basic salt of one of the trivalent metals chromium, aluminum and iron.

8. As a new product of manufacture, a stable rubber product containing paste comprising a combination of rubber particles and ions of basic chromium sulphate.

9. As a new product of manufacture, a stable rubber product comprising a combination of rubber and the ions of basic aluminum sulphate.

10. As a new product of manufacture, a stable rubber product comprising a combination of rubber and the ions of basic ferric sulphate.

11. The method of preparing a stable rubber product from a rubber dispersion which consists in thoroughly intermixing a mixture of a neutral salt and a basic salt of one of the group of trivalent metals chromium, aluminum and iron with the rubber dispersion.

12. The method of preparing a stable rubber product from a rubber dispersion which consists in thoroughly intermixing an aqueous solution of a mixture comprising a basic salt of one of the trivalent metals chromium, aluminum or iron and a neutral salt with the rubber dispersion, and thereafter neutralizing any free acid which may have been formed during the reaction by adding a small quantity of an alkali.

JOHN HELFRICH.